United States Patent

[11] 3,614,172

[72] Inventor Hugh E. Riordan
       Ann Arbor, Mich.
[21] Appl. No. 802,992
[22] Filed Feb. 27, 1969
[45] Patented Oct. 19, 1971
[73] Assignee Kelsey-Hayes Company
       Romulus, Mich.

[54] SKID CONTROL SYSTEM
    10 Claims, 2 Drawing Figs.
[52] U.S. Cl. .................................................. 303/21 BE,
                                                              188/181 A
[51] Int. Cl. .................................................. B60t 8/08
[50] Field of Search ........................................... 303/21,
                                             61–63, 68–69; 188/181

[56]                 References Cited
             UNITED STATES PATENTS
3,235,036  2/1966  Meyer et al. ................... 303/21 X
3,362,757  1/1968  Marcheron ..................... 303/21
3,494,671  2/1970  Slavin et al. ................... 303/21
3,525,553  8/1970  Carp et al. ..................... 303/21

Primary Examiner—Milton Buchler
Assistant Examiner—John J. McLaughlin
Attorney—Harness, Dickey & Pierce ABSTRACT: A skid control system for a wheeled vehicle varies the braking pressure as a function of slip speed which varies as a function of vehicle deceleration. The deceleration of the vehicle is detected and integrated to produce a signal $Vw_2$ representative of the actual loss of velocity of the vehicle. This signal $Vw_2$ is subtracted from initial vehicle velocity $Vw_1$ to get a signal $Vv$ indicative of instantaneous vehicle velocity. By subtracting instantaneous vehicle velocity $Vv$ from linear wheel velocity $Vw$ the slip speed signal $Vs$ is obtained. The slip speed signal $Vs$ is fed to a difference circuit which produces an output X when $Vs$ exceeds a reference slip signal $Vsr$ which varies as the deceleration. Output signal X causes actuation of a modulator to relieve brake pressure.

PATENTED OCT 19 1971
3,614,172
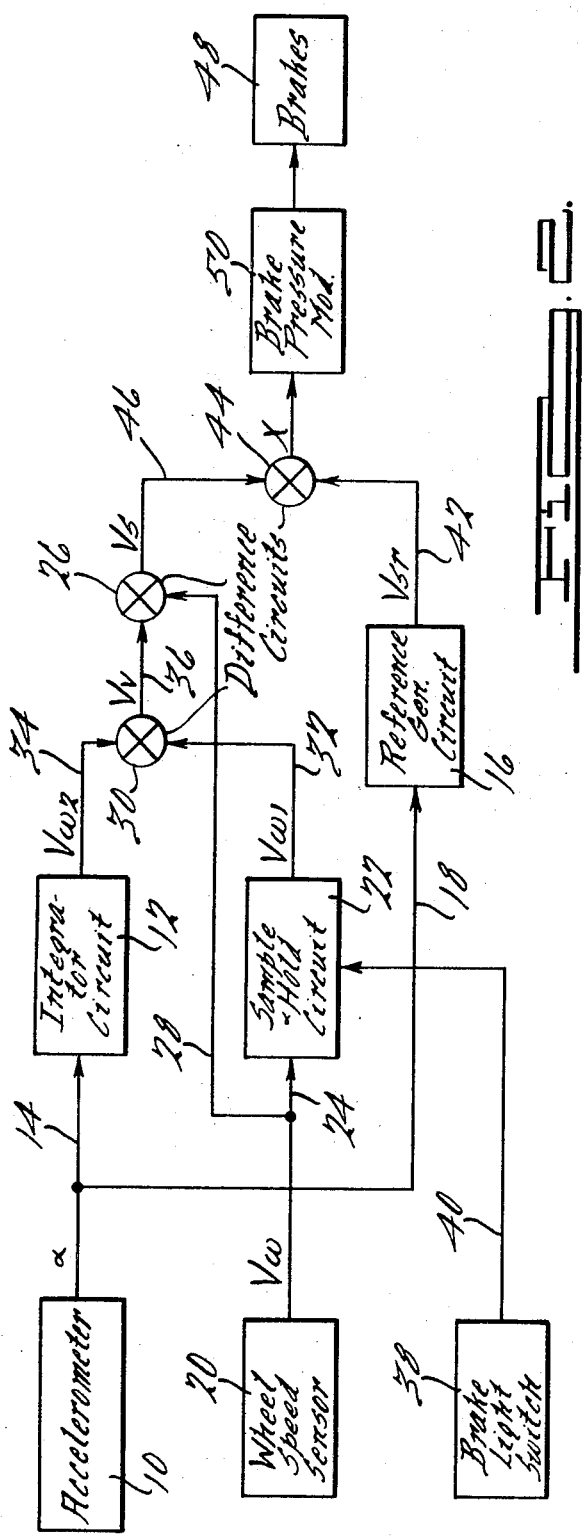
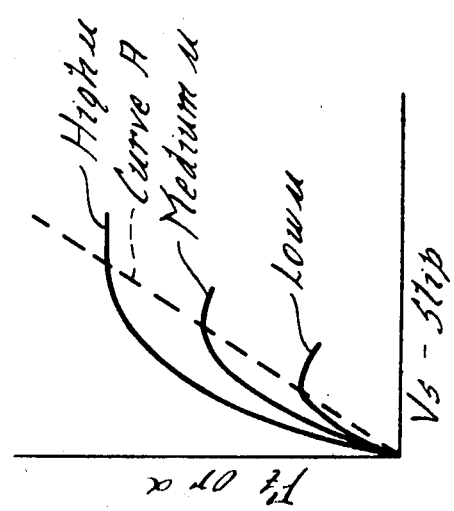
INVENTOR
Hugh E. Riordan.
BY Harness, Dickey & Pierce
ATTORNEY

SKID CONTROL SYSTEM

SUMMARY BACKGROUND OF THE INVENTION

The present invention relates to a vehicle skid control system and more particularly to a skid control system which operates as a function of slip speed.

Slip speed is defined as the difference between vehicle speed and wheel speed. In incipient skid conditions, this difference becomes excessive and reaches a maximum at wheel lockup. Ideal braking occurs when the braking force provides a determinable slip speed which is less than the maximum, i.e., short of locked wheel. Thus, braking of an automotive vehicle can be improved by maintaining the braking at a magnitude which will provide the ideal slip speed. This slip speed, however, will vary for different road conditions, i.e., high, medium or low $\mu$. The maximum vehicle deceleration will also vary with road conditions.

In the present invention, braking is controlled by relieving the brakes as a function of slip speed with the magnitude of the slip speed at which braking is relieved being varied as a function of the magnitude of the vehicle deceleration to provide a system sensitive to various road to tire adhesion conditions. Therefore, it is an object of the present invention to provide a skid control system operative as a function of the magnitude of slip speed; it is another object to provide such a system in which the magnitude of the slip speed is varied to reflect various road conditions. It is another object of the present invention to provide a novel skid control system.

Other objects, features, and advantages of the present invention will become apparent from the subsequent description and the appended claims, taken in conjunction with the accompanying drawing, in which:

FIG. 1 is a graph depicting the relationship of tractive force (Ft) or vehicle deceleration ($\alpha$) versus slip speed (Vs); and FIG. 2 is a block diagram of the system of the present invention.

Looking now to FIG. 1, a family of curves is shown depicting the relationship between the tractive forces (Ft) of the tire with the road in braking and the slip speed, i.e., vehicle speed (Vv) minus wheel speed (Vw). It can be seen that under each of the different road conditions, i.e., high, medium $\mu$, etc., a determinable magnitude of slip speed (Vs) will result in maximum retarding force (Ft) or vehicle deceleration ($\alpha$). It can also be noted that desirable magnitude of slip speed (Vs) to provide maximum tractive force in braking for the various road conditions varies as a generally linear function (curve A) with respect to vehicle deceleration. In the system of the present invention, as shown in FIG. 2, the braking force or pressure is relieved when the slip speed (Vs) exceeds a preselected magnitude and in order to compensate for different road conditions this magnitude is varied as a function of vehicle deceleration ($\alpha$) such that the preselected magnitude (Vs) will generally vary linearly in the manner of curve A.

Looking now to FIG. 2, the system includes a linear accelerometer 10 having an acceleration (or deceleration) output signal $\alpha$ the magnitude of which corresponds to the acceleration (or deceleration) of the vehicle. The acceleration signal $\alpha$ is conducted to an integrator circuit 12 via conductor 14 and to a reference generator circuit 16 via conductor 18. A wheel speed sensor 20 provides an output signal Vw the magnitude of which is an indication of linear wheel velocity for the one or more wheels of the vehicle the brakes of which are to be controlled. The wheel velocity signal Vw is transmitted to a sample and hold circuit 22 via conductor 24 and to a difference circuit 26 via conductor 28. The output signal Vw1 from the hold circuit 22 is transmitted to a difference circuit 30 via conductor 32; the output signal Vw2 from the integrator circuit 12 is also transmitted to difference circuit 30 via conductor 34 whereby an output signal Vv representative of instantaneous vehicle velocity will result at output conductor 36. The signal Vv is obtained in the following manner. During nonbraking conditions, the velocity of the vehicle (Vv) and the linear wheel velocity (Vw) are equal. During braking, however, as a result of slip the velocity Vv is greater than the Vw. By detecting the deceleration of the vehicle during braking via accelerometer 10 and integrating the deceleration signal $\alpha$ via the integrator 12 a signal Vw2 will be obtained which substantially represents the actual loss of velocity of the vehicle due to braking. The magnitude of linear wheel velocity Vw just prior to braking represents the velocity of the vehicle prior to any braking deceleration. The magnitude of this velocity is stored by sample and hold circuit 22. The hold circuit 22 will continuously sample the signal Vw; upon application of the brakes of the vehicle the brake light switch 38 will be actuated and will provide a signal to hold circuit 22 via conductor 40 in response to which hold circuit 22 will hold and retain the magnitude of the signal Vw received just prior to actuation of switch 38 and will provide output signal Vw1 which is an indication of the magnitude of vehicle velocity just prior to the brake application. By subtracting the loss of vehicle velocity (Vw2) from the initial vehicle velocity (Vw1) an indication of instantaneous vehicle velocity (Vv) during the brake deceleration of the vehicle will be obtained. This subtraction is provided by the difference circuit 30. Next the actual magnitude of slip velocity (Vs) is obtained by subtracting the instantaneous vehicle velocity (Vv) from the linear wheel velocity (Vw). This subtraction is provided by the difference circuit 26.

The reference generator 16 provides a reference slip speed signal Vsr at conductor 42. The slip speed signal Vs is transmitted to difference amplifier 44 from the difference circuit 26 via conductor 46 and is subtracted from the reference slip signal Vsr which is received via conductor 42. The magnitude of the reference signal Vsr is selected to be substantially equal to that magnitude of slip speed which provides maximum retarding force (Ft), see FIG. 1. When the actual slip speed Vs exceeds the reference speed Vsr an output signal is provided from circuit 44 whereby brake pressure can be relieved or modulated.

The magnitude of reference slip speed Vsr is varied with the deceleration signal $\alpha$ whereby the reference signal Vsr will vary in magnitude generally in the manner of curve A (FIG. 1) to provide for operation responsive to different road conditions, i.e., high $\mu$, etc.

The vehicle brakes 48 for the selected vehicle wheels will be relieved or modulated by a brake pressure modulator 50 which will provide appropriate modulation in response to the occurrence of signal $\alpha$ which is generated when Vs exceeds Vsr. The modulator 50 can be of various constructions and could be of the type shown in the copending U.S. Pat. application of Every et al., Ser. No. 642,861, filed June 1, 1967, and the subject matter of that application is incorporated herein by reference. Thus, with the system as shown and described, braking will be controlled such as to maintain the determinable, advantageous magnitude of slip speed.

Note the specific constructional details of the accelerometer 10, wheel speed sensor 20 and brake light switch 38 and the specific circuit details of the integrator circuit 12, the sample and hold circuit 22, reference generator 16, and difference circuits 26, 30 and 44 in no way constitute a part of the present invention and are within the purview of one skilled in the art and have been omitted for the purpose of simplicity.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A skid control system for a wheeled vehicle having a plurality of wheels and a braking system for effecting braking of the wheels, said skid control system comprising: first means for providing a first signal having a magnitude indicative of the slip between the vehicle and at least one wheel of the vehicle, second means for modulating the braking at least at that one wheel in response to said first signal attaining a selected magnitude indicative of a preselected magnitude of slip, said second means including means for varying the selected magnitude of said first signal at which brake modulation occurs in response to sensed frictional variations between the one wheel and the driving surface.

2. The system of claim 1 with said first means including accelerometer means for providing a second signal indicative of the deceleration of the vehicle, said second means responsive to said second signal for varying the selected magnitude of said first signal at which brake modulation occurs in accordance with variations in the magnitude of said second signal.

3. The system of claim 2 with said first and second means as responsive to said first and second signals providing brake modulation at lower magnitudes of slip for lower magnitudes of vehicle deceleration.

4. A skid control system for a wheeled vehicle having a plurality of wheels and a braking system for effecting braking of the wheels, said skid control system comprising: first means for providing a first signal having a magnitude indicative of the slip between the vehicle and at least one wheel of the vehicle, second means for modulating the braking at least at that one wheel in response to said first signal attaining a selected magnitude indicative of a preselected magnitude of slip, said second means varying the selected magnitude of said first signal at which brake modulation occurs in response to sensed frictional variations between the one wheel and the driving surface, said first means including accelerometer means for providing a second signal indicative of the deceleration of the vehicle, said second means responsive to said second signal for varying the selected magnitude of said first signal at which brake modulation occurs in accordance with variations in the magnitude of said second signal, said first and second means as responsive to said first and second signals providing brake modulation at lower magnitudes of slip for lower magnitudes of vehicle deceleration, first means further comprising velocity means for providing a third signal having a magnitude varying in accordance with variations in magnitude of the speed of one wheel, integrator means responsive to said second signal for providing a fourth signal representative of the integral of said second signal and hence the integral of vehicle deceleration, sample means responsive to actuation of the brake system and to said third signal for providing a fifth signal having a magnitude indicative of the velocity of the wheel prior to actuation of the brake system, first computer means responsive to said fourth and fifth signals for providing a sixth signal having a magnitude indicative of the instantaneous vehicle velocity, and second computer means responsive to said third and sixth signals for providing a seventh signal having a magnitude indicative of the slip between the vehicle and that wheel.

5. The system of claim 4 with said second means comprising reference means for providing a eighth signal having a magnitude indicative of said preselected magnitude of slip at which brake modulation occurs and being varied in magnitude in accordance with variations in magnitude of said second signal, said second means further comprising third computer means responsive to said seventh and eighth signals for providing an output signal in response to the relative magnitudes of said seventh and eighth signals having a predetermined relationship, and modulating means responsive to said output signal for modulating the braking at that one wheel.

6. The system of claim 5 with said output signal being provided when the magnitude of said seventh signal exceeds the magnitude of said eighth signal.

7. A skid control system for a wheeled vehicle having a plurality of wheels and a braking system for effecting braking of the wheels, said skid control system comprising: first means for providing a first signal having the magnitude indicative of the slip between the vehicle and at least one wheel of the vehicle, second means for modulating the braking at least at that one wheel in response to said first signal attaining a selected magnitude indicative of a preselected magnitude of slip, said second means varying the selected magnitude of said first signal at which brake modulation occurs in response to sensed frictional variations between the one wheel and the driving surface, said first means including accelerometer means for providing a second signal indicative of the deceleration of the vehicle, said second means responsive to said second signal for varying the selected magnitude of said first signal at which brake modulation occurs in accordance with variations in the magnitude of said second signal, said first and second means as responsive to said first and second signals providing brake modulation at lower magnitudes of slip for lower magnitudes of vehicle deceleration, said first means further comprising velocity means for providing a third signal having a magnitude varying in accordance with variations in magnitude of the speed of the one wheel, integrator means responsive to said second signal for providing a fourth signal representative of the integral of said second signal and hence the integral of vehicle deceleration, sample means responsive to actuation of the brake system and to said third signal for providing a fifth signal having a magnitude indicative of the velocity of the wheel prior to actuation of the brake system, computer means responsive to said third, fourth and fifth signals for providing a slip signal having a magnitude indicative of the slip between the vehicle and that wheel.

8. The system of claim 7 with said second means comprising reference means for providing a reference signal having a magnitude indicative of said preselected magnitude of slip at which brake modulation occurs and being varied in magnitude in accordance with variations in magnitude of said second signal, said computer means responsive to said slip and reference signals for providing an output signal in response to the relative magnitudes of said slip and reference signals having a predetermined relationship, and modulating means responsive to said output signal for modulating the braking at that one wheel.

9. The system of claim 8 with said output signal being provided when the magnitude of said slip signal exceeds the magnitude of said reference signal.

10. A skid control system for a wheeled vehicle having a plurality of wheels and a braking system for effecting braking of the wheels, said skid control system comprising: first means for providing a first signal having a magnitude indicative of the slip between the vehicle and at least one wheel of the vehicle, second means for modulating the braking at least at that one wheel in response to said first signal attaining a selected magnitude indicative of a preselected magnitude of slip, said second means varying the selected magnitude of said first signal at which brake modulation occurs in response to sensed frictional variations between the one wheel and the driving surface, said first means including accelerometer means for providing a second signal indicative of the deceleration of the vehicle, said second means responsive to said second signal for varying the selected magnitude of said first signal at which brake modulation occurs in accordance with variations in the magnitude of said second signal, said first and second means as responsive to said first and second signals providing brake modulation at lower magnitudes of slip for lower magnitudes of vehicle deceleration, said first means further comprising velocity means for providing a third signal having a magnitude varying in accordance with variations in magnitude of the speed of the one wheel, integrator means responsive to said second signal for providing a fourth signal representative of the integral of said second signal and hence the integral of vehicle deceleration, sample means responsive to actuation of the brake system and to said third signal for providing a fifth signal having a magnitude indicative of the velocity of the wheel prior to actuation of the brake system, reference means providing a reference signal having a magnitude indicative of said preselected magnitude of slip at which brake modulation occurs and being varied in magnitude in accordance with variations in magnitude of said second signal, computer means responsive to said third, fourth, fifth and reference signals having a predetermined relationship for providing an output signal, and modulating means responsive to said output signal for modulating the braking at that one wheel.